No. 661,837. Patented Nov. 13, 1900.
W. WILSON.
SIZING KETTLE.
Application filed Aug. 17, 1900.

(No Model.) 2 Sheets—Sheet 1.

WITNESSES:
J. A. Brophy
J. B. Owens.

INVENTOR
William Wilson.
BY Munn
ATTORNEYS

THE NORRIS PETERS CO., PHOTO-LITHO., WASHINGTON, D. C.

No. 661,837. Patented Nov. 13, 1900.
W. WILSON.
SIZING KETTLE.
(Application filed Aug. 17, 1900.)
(No Model.) 2 Sheets—Sheet 2.
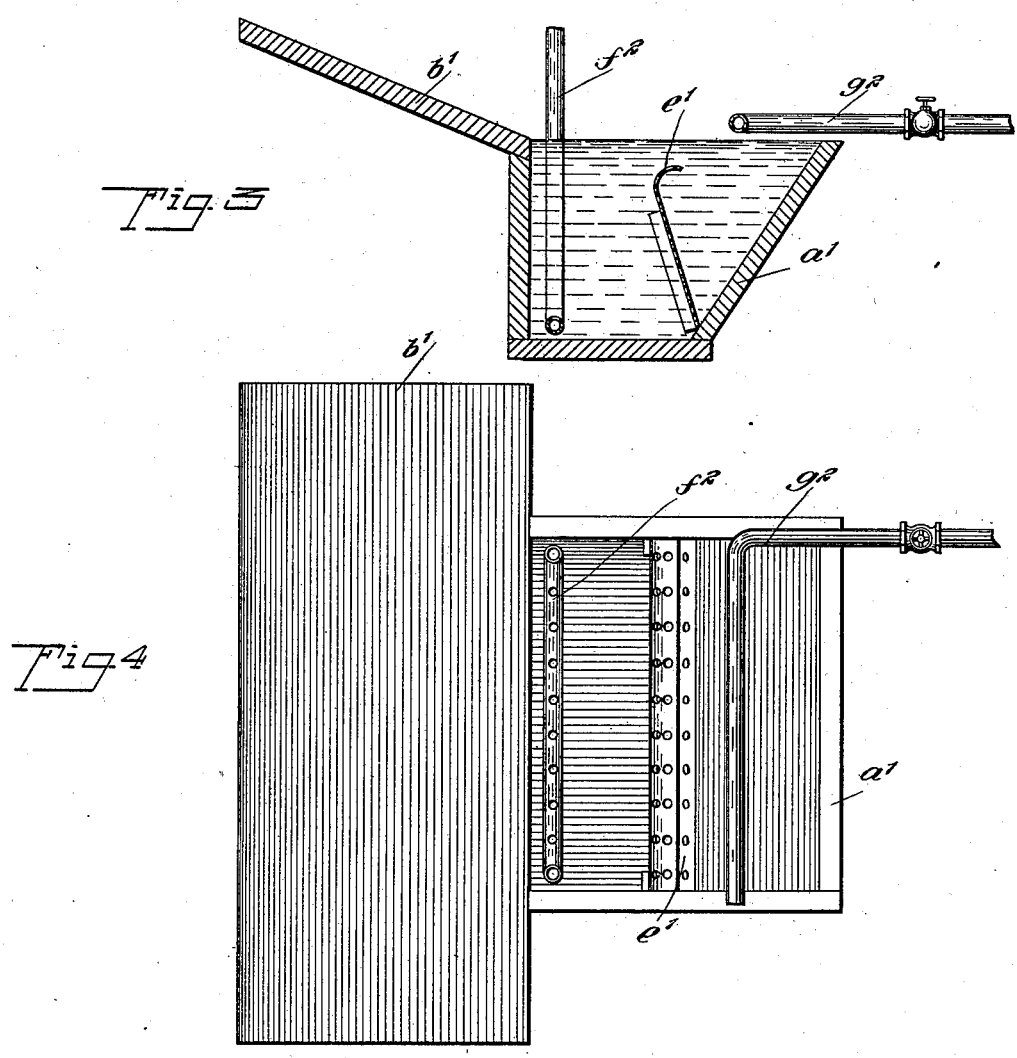
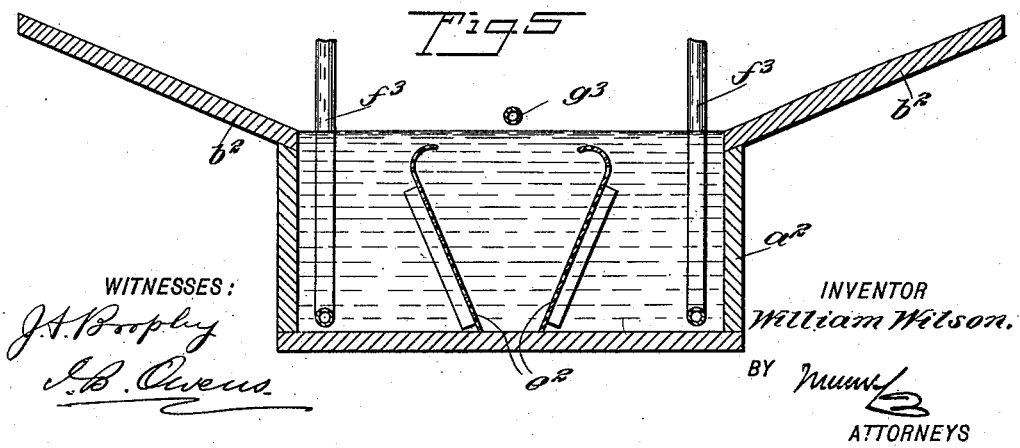
WITNESSES:
J. A. Brophy
J. B. Owens
INVENTOR
William Wilson.
BY Munn
ATTORNEYS
THE NORRIS PETERS CO., PHOTO-LITHO., WASHINGTON, D. C.

UNITED STATES PATENT OFFICE.

WILLIAM WILSON, OF DANBURY, CONNECTICUT.

SIZING-KETTLE.

SPECIFICATION forming part of Letters Patent No. 661,837, dated November 13, 1900.

Application filed August 17, 1900. Serial No. 27,172. (No model.)

*To all whom it may concern:*

Be it known that I, WILLIAM WILSON, a citizen of the United States, and a resident of Danbury, in the county of Fairfield and State of Connecticut, have invented a new and Improved Sizing-Kettle, of which the following is a full, clear, and exact description.

The purpose of this invention is to provide a sizing-kettle with means by which the water therein may be kept clear and free from the impurities which exist in the sizing-kettle during the use thereof.

This specification is the disclosure of several forms of the invention, while the claims define the actual scope thereof.

Reference is to be had to the accompanying drawings, forming a part of this specification, in which similar characters of reference indicate corresponding parts in all the views.

Figure 1:
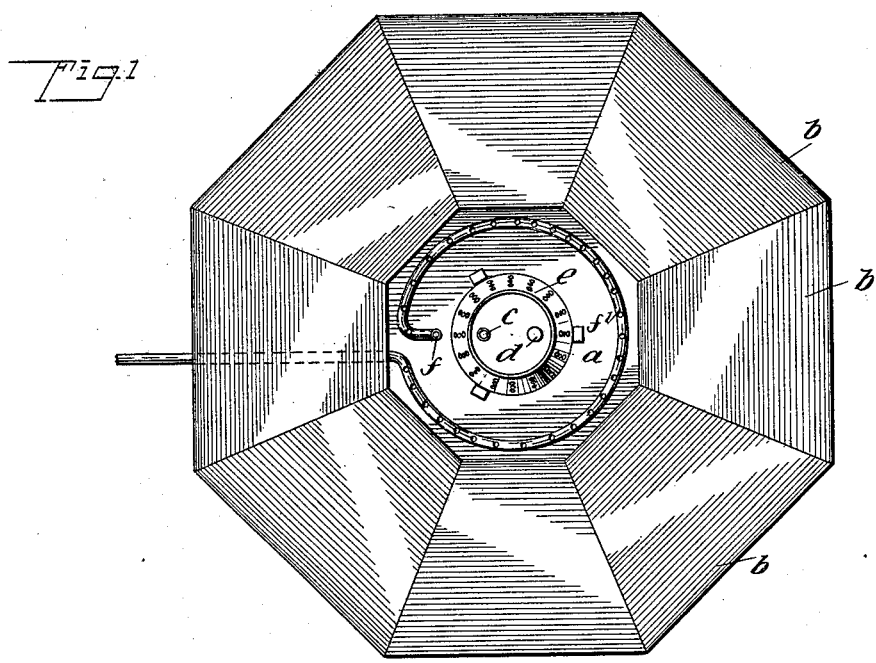
Figure 2:
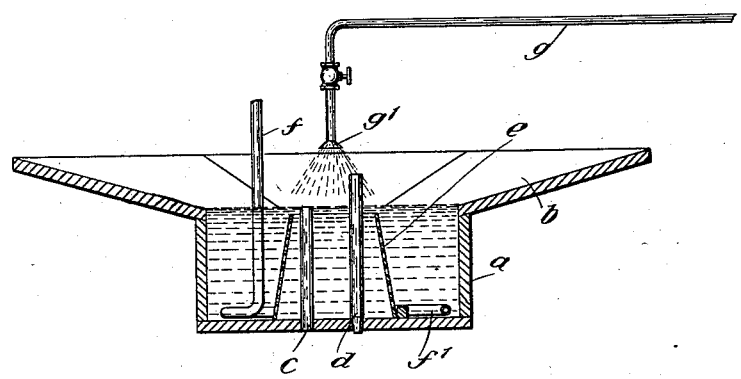

Figure 1 is a plan view of the invention. Fig. 2 is a vertical section thereof. Fig. 3 is a cross-section of a modification. Fig. 4 is a plan view of the same, and Fig. 5 is a cross-section of another modification.

Referring to Figs. 1 and 2, $a$ represents the sizing-kettle, which is shown to be of the round form and provided with a number of ledges $b$, forming work-tables for the persons at work with the kettle and around which the persons stand. The kettle is provided with an overflow-pipe $c$ and with a plug $d$, closing an opening in the bottom of the kettle, through which the contents thereof may be withdrawn. Removably seated in the bottom of the kettle and surrounding the overflow-pipe $c$ and plug $d$ is a strainer $e$. This strainer is shown to be in the form of the frustum of a cone, although this shape is not strictly necessary. The strainer is open at its top and has its bottom rested snug on the bottom of the kettle. The side walls of the strainer are perforated, as shown. A steam-jet pipe $f$ passes down into the bottom of the kettle and has its lower end $f'$ coiled around the strainer $e$, such end $f'$ being perforated to form jets, so that the steam passing up from the bottom of the kettle will heat the water therein. A water-pipe $g$ leads down to the kettle and has a rose or other spraying device $g'$ at its discharge end, such rose being arranged to spray the water from the pipe $g$ down on the water within the kettle, at the center thereof, and consequently immediately above the strainer $e$. The water in the pipe $g$ is cold, and this water in connection with the steam from the pipe $f$ will cause a continuous circulation of the water in the kettle, the water at the sides of the kettle passing upward, owing to the heat from the pipe $f$, and then turning inward and passing down into the strainer $e$, owing to the cold water from the pipe $g$. The upper end of the strainer is arranged just below the upper end of the discharge-pipe $c$, so that the level of water in the kettle is just above the strainer. All of the impure matter which floats in the sizing-kettle on top of the water therein will thus be caused to pass down into the strainer, and it will be held therein, so that only clear clean water is permitted to pass outside of the strainer. The workmen use the water on the outside of the strainer—that is, in the space between the strainer and the walls of the kettle—and it will thus be seen that the impurities in the kettle, which are due to the work that is carried on therein, will not be permitted to interfere with the operations of the workmen.

Figs. 3 and 4 show a form of kettle adapted for only one workman, in which case the kettle $a'$ is rectangular in form and has the table $b'$ for the convenience of the workman. The steam-pipe $f^2$ passes down into the bottom of the kettle immediately adjacent to the table $b'$ and the water-pipe $g^2$ leads to the side of the kettle opposite the side having the table $b'$. The strainer $e'$ is in the form of a sheet-metal plate, which is located with its upper edge between the two pipes $f^2$ and $g^2$. This upper edge is curved laterally toward the pipe $g^2$, so as to form a sort of inclosure for the impurities. In this form of the invention the operation is precisely the same as that before described. The water circulates upward around the pipe $f^2$, over the top of the strainer, and downward below the pipe $g^2$, causing all the impurities to be retained in the space between the strainer $e'$ and the right-hand wall of the kettle.

In Fig. 5 is shown a rectangular kettle $a^2$ having two tables $b^2$, providing facilities for two workmen. This form of the invention has two steam-pipes $f^3$, respectively located adjacent to the tables $b^2$, and in the middle of the kettle, at the top thereof, is arranged a water-pipe $g^3$. Two strainers $e^2$ are provided, which are similar to the strainer $e'$, and are set oppositely to each other, so as to form an inclosure somewhat similar to that formed by the strainer $e$, except that this inclosure in Fig. 5 runs throughout the length of the kettle $a^2$ from end to end thereof.

Having thus described my invention, I claim as new and desire to secure by Letters Patent—

1. The combination of a kettle or other vessel, a strainer arranged therein and forming the vessel into two compartments, and means for enforcing the circulation of water upward in one compartment and downward in the other.

2. The combination of a kettle or other vessel, a strainer therein, the strainer forming the vessel into two compartments, a steam-pipe located in one of said compartments, and a cold-water pipe located over the other of said compartments.

3. The combination of a kettle, an essentially cylindrical strainer mounted therein and forming the kettle into two compartments, a steam-pipe surrounding the strainer and located in the outer compartment, and a cold-water pipe located over the top of the inner compartment.

In testimony whereof I have signed my name to this specification in the presence of two subscribing witnesses.

WILLIAM WILSON.

Witnesses:
   SAMUEL W. TASCH,
   WM. C. ELY.